US007880348B2

(12) United States Patent
McElveen et al.

(10) Patent No.: US 7,880,348 B2
(45) Date of Patent: Feb. 1, 2011

(54) METHOD OF INSTALLING A PERMANENT MAGNET MOTOR IN A COOLING TOWER AND A SHROUD USED IN CONNECTION THEREWITH

(75) Inventors: Robert McElveen, Anderson, SC (US); William E. Martin, Greenville, SC (US); Stephen T. Evon, Easley, SC (US)

(73) Assignee: Baldor Electric Company, Fort Smith, AR (US)

( * ) Notice: Subject to any disclaimer, the term of this patent is extended or adjusted under 35 U.S.C. 154(b) by 258 days.

(21) Appl. No.: 12/336,126

(22) Filed: Dec. 16, 2008

(65) Prior Publication Data

US 2010/0150748 A1    Jun. 17, 2010

(51) Int. Cl.
*H02K 1/32*    (2006.01)
(52) U.S. Cl. .................................... 310/64; 310/216.56
(58) Field of Classification Search .................. 310/64, 310/89, 216.07, 216.55; 290/44–45
See application file for complete search history.

(56) References Cited

U.S. PATENT DOCUMENTS

| 4,103,192 | A | * | 7/1978 | Wendt et al. ................... 310/64 |
| 4,105,905 | A | * | 8/1978 | Barcus ......................... 310/59 |
| D253,783 | S | | 12/1979 | Engalitcheff, Jr. |
| D254,149 | S | | 2/1980 | Engalitcheff, Jr. |
| 4,415,824 | A | * | 11/1983 | Meier .......................... 310/89 |
| 4,465,946 | A | * | 8/1984 | Springer ..................... 310/426 |
| 4,742,257 | A | * | 5/1988 | Carpenter .................... 310/62 |
| 4,786,833 | A | * | 11/1988 | Knobel ........................ 310/89 |
| 4,839,547 | A | * | 6/1989 | Lordo et al. .............. 310/60 A |
| 5,008,575 | A | * | 4/1991 | Ishimoto et al. ............... 310/89 |
| 5,630,461 | A | * | 5/1997 | CoChimin .................... 164/34 |
| 7,402,932 | B2 | | 7/2008 | Applegate |
| 2010/0045228 | A1 | | 2/2010 | Rollins et al. |

FOREIGN PATENT DOCUMENTS

CZ    18242 U1    2/2008

OTHER PUBLICATIONS

Fans Cooling Technologies, Product Catalogue, Jun. 2008, 2 pages.
McElveen, Robert, et al., Co-Pending Design U.S. Appl. No. 29/329,494 entitled "Shroud for Cooling Tower Fan Motor" filed Dec. 16, 2008.
McElveen, Robert, et al., Co-Pending Design U.S. Appl. No. 29/329,492 entitled "Cooling Tower Fan Motor" filed Dec. 16, 2008.

\* cited by examiner

*Primary Examiner*—Thanh Lam
(74) *Attorney, Agent, or Firm*—Thompson Coburn LLP

(57) ABSTRACT

A method comprises providing a motor with a stator comprising a plurality of laminations stacked side to side to form a contiguous stator core with each of the laminations having a plurality of radial fins projecting outward from a periphery of the lamination, and a rotor with permanent magnets spaced about the rotor configured to synchronously magnetically couple with a rotating magnetic field in the stator. The method further comprises providing a cooling tower with a fan disposed therein having a shaft extending from a center of the fan for rotating the fan. The motor is installed in the cooling tower such that the rotor of the motor is coupled directly to the fan shaft and rotates the fan when the motor is energized during normal operation of the cooling tower.

12 Claims, 6 Drawing Sheets

METHOD OF INSTALLING A PERMANENT MAGNET MOTOR IN A COOLING TOWER AND A SHROUD USED IN CONNECTION THEREWITH

RELATED ART DISCLOSURE

This invention relates to methods of installing a permanent magnet motor in a cooling tower for driving a fan of the cooling tower and eliminating a gearbox and a drive shaft mechanism typically used in cooling tower applications.

BACKGROUND OF THE INVENTION

The most common solution for driving a fan in a modern cooling tower utilizes a induction motor, a drive shaft, disk couplings associated with the drive shaft, and a right angle gearbox, all interconnected to drive a fan of the cooling tower. A typical arrangement is shown in FIG. 1. Generally speaking, a motor 10 is installed outside a cooling tower 12 and a right angle gearbox 14 is installed in the cooling tower and a drive shaft 16 connects the two together via disk couplings 18 to rotate a fan 20 of the cooling tower. The motor is typically a standard National Electrical Manufactures Association (NEMA) frame induction motor. Depending upon the application, a variable frequency drive 22 may be re used to control the speed of the induction motor 10.

There are several drawbacks with this arrangement. It is often difficult to maintain proper lubrication of the right angle gearbox at low speed. Because of the inertia of the drive chain and fan, the induction motor often draws high levels of current at start-up. The right angle gearbox and drive shaft often have maintenance problems caused by fatigue, vibration, misalignment, contamination, and lack of lubrication. The methods disclosed herein solve these issues with an electrically efficient drive mechanism.

DETAILED DESCRIPTION OF THE DISCLOSED EMBODIMENTS

As is known, cooling towers are used in a variety of HVAC and refrigeration applications, light to heavy industrial applications, chemical processing and refining, and power generation. A cooling tower creates an artificial breeze over heated processed water in order to accelerate the evaporative cooling process. The artifical breeze is generated by a fan usually positioned in a draft tower. Generally speaking, the fans used in cooling tower applications range in size anywhere from 7 to 28 feet, and are typically cast from aluminum alloys for cost and favorable internal vibration dampening and corrosion resistance characteristics. Generally speaking, fans in this size range rotate within the cooling tower between 127 to 465 revolutions per minute, depending on the rating of the cooling tower and the size of the fan. Many times, the speed range falls between 155 rpm and 320 rpm. Generally speaking, fans of this size generate a flow rate of between 1200 cubic feet per minute and 2200 cubic feet per minute at the aforementioned speeds of rotation, and have a blade pitch of between 6 degrees and 12 degrees.

Figure 1:
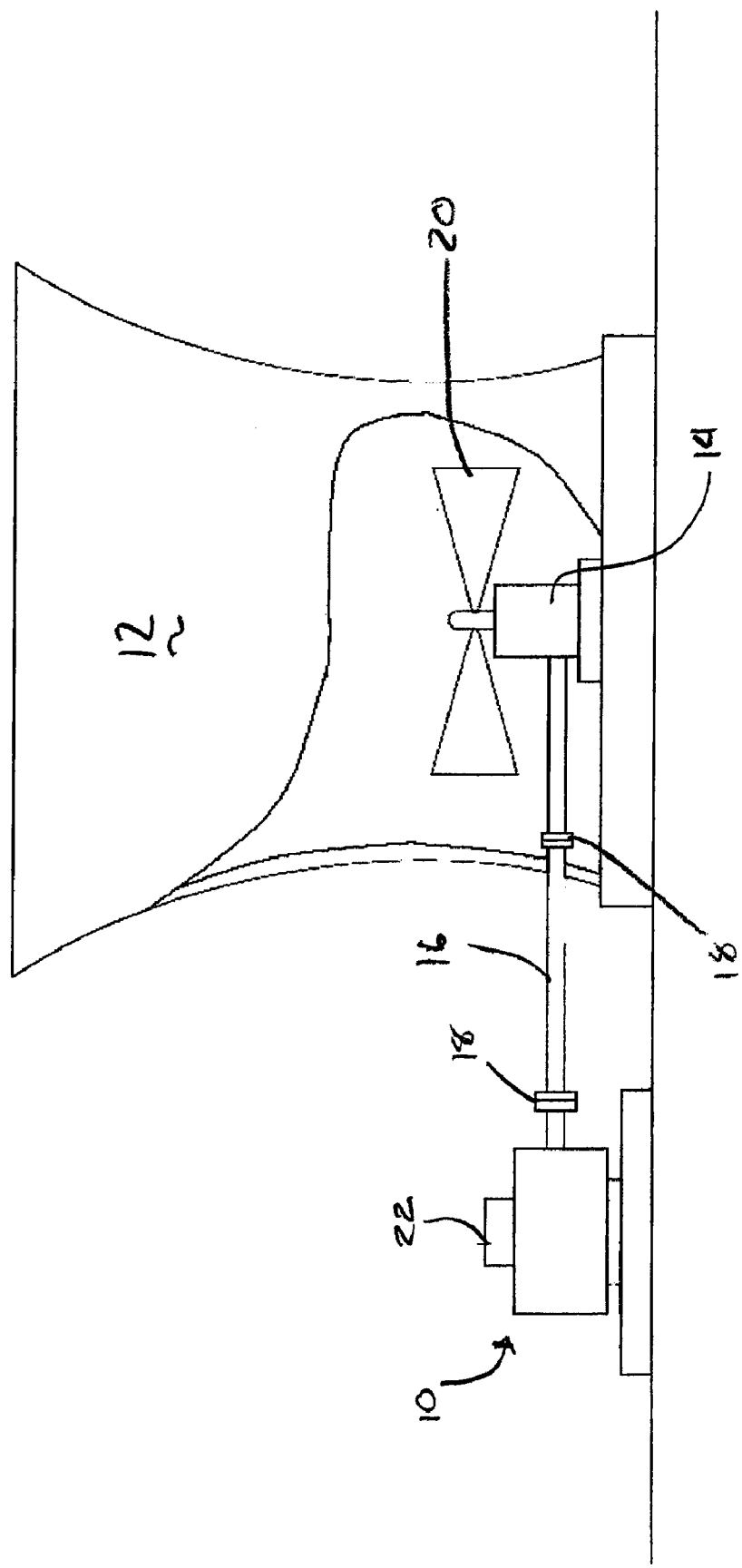
FIG. 1 shows a diagrammatical view of a prior art cooling tower system with a cooling tower partially cut-away to show its internal features such as a drive shaft, disk couplings, a right angle gearbox, and a fan of the cooling tower system, and external features of the cooling tower system comprising an induction motor.

FIG. 1 shows a typical arrangement for a cooling tower. A standard NEMA rated induction motor 10, which may be equipped with a variable frequency drive 22 depending upon the application to control the speed of the induction motor, is positioned outside of the cooling tower 12 and a right angle gearbox 14 is positioned in the cooling tower for driving the cooling tower fan. A drive shaft 16 with disk couplings 18 connects the motor to the right angle gearbox. Right angle gearboxes typically used in cooling towers applications range from a 65 size to a 175 size with a common speed reduction ratios of between 3.5:1 and 8.5:1. Many right angle gearbox manufacturers provide several different models of right angle gearboxes with various combinations of speed input and reduction. One such provider is Amarillo Gear Company of Amarillo, Tex. As discussed below, because the induction motor, drive shaft, couplings, and right angle gearbox are removed, and preferably replaced with a finned laminated frame, variable speed, permanent magnet motor that directly drives the fan, the permanent magnet motor requirements are consistent with the performance requirements of the cooling tower system as set forth above.

Figure 2:
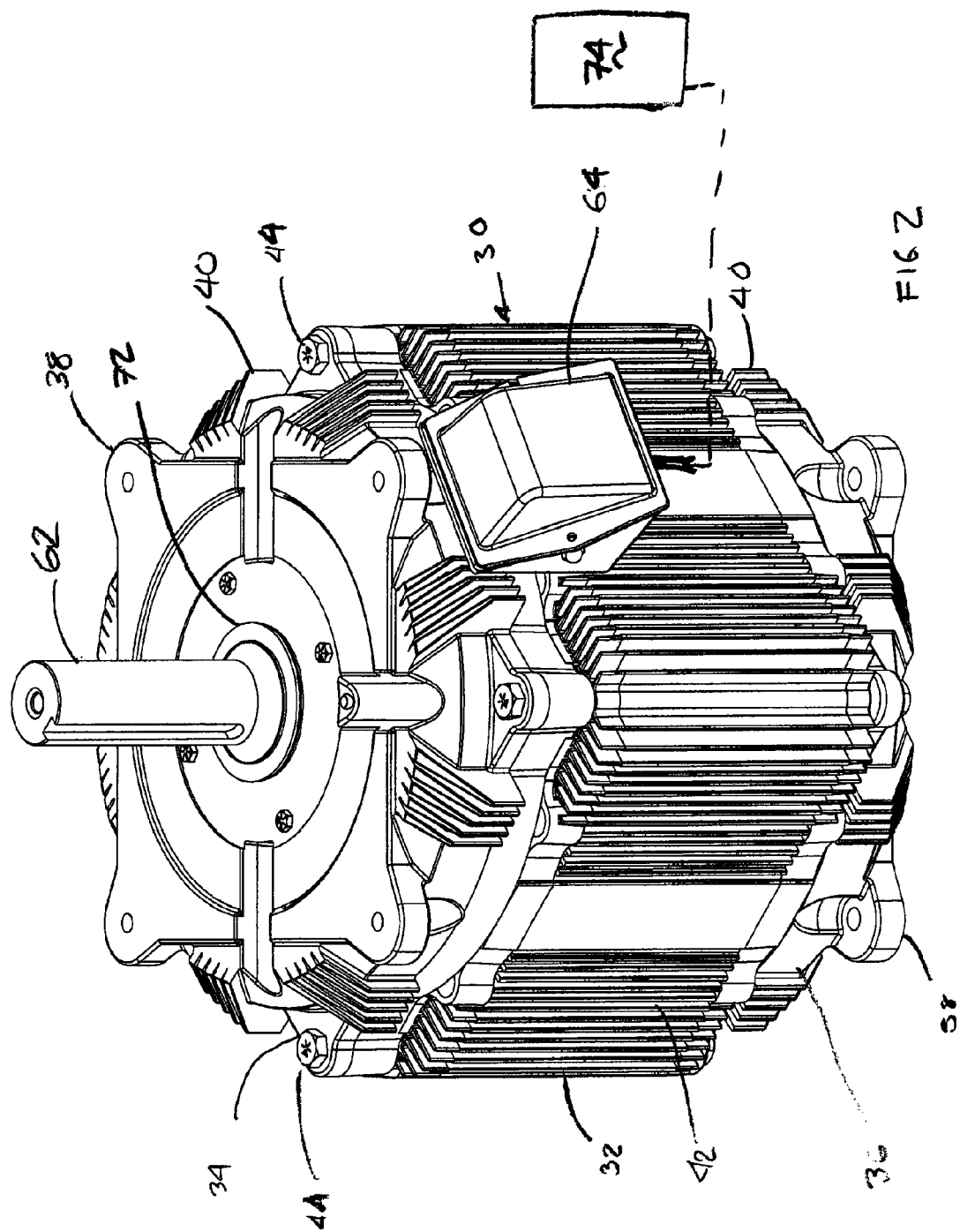
FIG. 2 shows a perspective view of a finned laminated frame, variable speed, permanent magnet motor used in accordance with the principles of the disclosure.

FIG. 2 shows one type of a permanent magnet motor 30, i.e., a finned frame, variable speed, permanent magnet motor, that may be used to directly drive the fan of the cooling tower. The exemplary machine 30 includes a stator core 32 capped at opposite ends by drive-end and opposite drive-end endcaps 34,36, respectively. Advantageously, the exemplary endcaps 34, 36 include mounting and transportation features, such as the mounting flanges 38, as well as heat dissipation features, such as the endcap cooling fins 40. The stator core 32, which defines the central, peripheral portions of the motor 30, also includes protruding stator cooling fins 42 to improve heat dissipation. The endcaps 34,36 and the stator core 32 are maintained in assembly by through-bolts 44 extending axially through the endcaps and the stator core.

Figure 3:
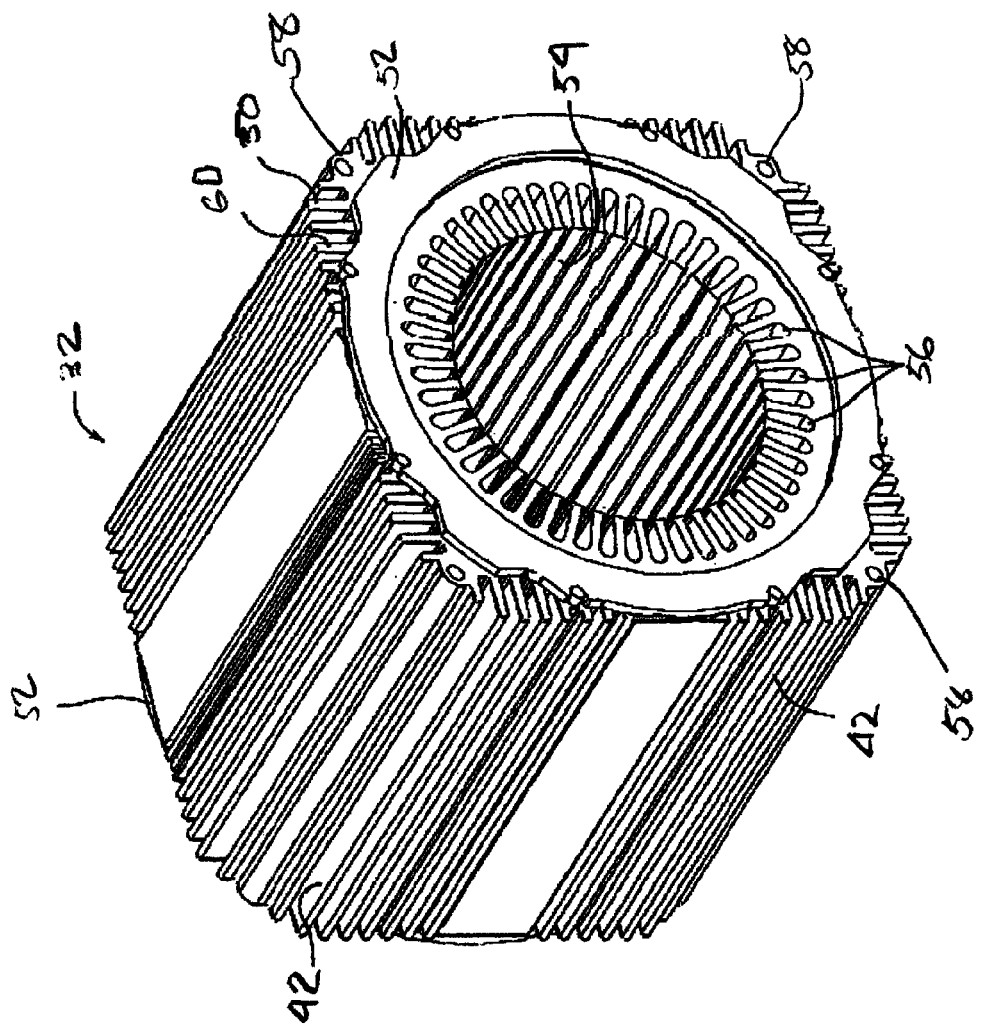
FIG. 3 is a perspective view of a stator core assembly of the motor of FIG. 2.

As is best illustrated in FIG. 3, the stator core 32 comprises a plurality of stator laminations 50 aligned and assembled with respect to one another to form the contiguous stator core. Moreover, this figure also well illustrates that the stator core 32 at least partially defines an external surface (i.e., peripheral) surface of the motor 30. Thus, as is discussed further below, airflow directed over the stator core's cooling fins 42 without any intermediate structure, such as a frame, improves the efficacy of cooling techniques for dissipating heat generated in the motor during operation. The exemplary stator core 32 also includes end rings 52 disposed on opposite ends of the stator core 32. These end rings 52 facilitate assembly of the stator laminations 50 with respect to one another and, further, facilitate assembly of the stator core 32 with respect to the endcaps 34, 36.

When assembled, the stator laminations 50 cooperate to present a number of features and attributes. For example, the stator laminations 50 cooperate to define a central chamber 54 that extends axially thought the stator core 32 and in which a rotor resides. These laminations 50 also cooperate to define slots 56 that extend axially through the stator core and that are configured to support the stator windings. Each stator lamination 50 also includes a through-bolt receiving aperture 58 located on the stator lamination in a position to maximize the structural integrity of the assembled stator core. Further still, the outer peripheries of the laminations 50 cooperate to form the outer peripheral surfaces 60 of the stator core 32, which is also an outer peripheral surface of the motor 30. For example, radially extending stator fins 60 of adjacent laminations cooperate to form the cumulative stator fin 42 that preferably extends the length of the stator core 32. As illustrated the exemplary stator lamination 50 has a generally square outline, with the lamination's radially extending fins 60 generally defining a rectangular shape. The stator laminations (and the resulting motor) may have a cross-section resembling a square. Providing the radially extending stator fins 60 on each lamination increases the outer periphery and overall surface area of the stator core 32, thus increasing the surface area over which cooling airflow travels. Increasing the surface area over which airflow travels improves heat dissipation in the motor 30. Preferably, the longitudinally extending heat dissipation fins 42 extend along a substantial length of the motor and are generally equally spaced about the motor. The fins eliminate the cast-iron outer frame often used with induction motors and enables ambient air to cool the motor. Because the ambient air is in direct contact with the electrical steel of the stator laminations, thermal resistance is minimized from that which is often seen in traditional cast-iron frames that surround stator laminations. In turn, the efficiency of the motor can be improved and the amount of active material forming the motor and laminations may be reduced thereby corresponding to a reduction in the ratio of the active material per horse power employed in the motor's construction. Such stator laminations 50 can be fabricated via a stamping process, in which a material blank is stamped to produce the desired shape.

To induce rotation of a rotor shaft assembly 62 rotatably disposed within the stator core 32, alternating current preferably supplied at a variable frequency is routed through windings disposed in the stator core. The stator windings are electrically interconnected to form groups that are, in turn, interconnected in a manner generally known in the pertinent art. These stator windings are further coupled to terminal leads that electrically connect the stator windings to an external power source, such as a 480 VAC. The electrical connection between the terminal leads and the external power source is housed in a conduit box 64. The conduit box may be formed of metal or plastic and, advantageously, provides access to certain electrical components of the motor, for repair and maintenance, for instance.

Routing electrical current from external power source through the stator windings creates electromagnetic relationships with permanent magnets mounted on the rotor that cause rotation of the rotor. Rotation of the rotor within the electrical device is facilitated by drive-end and opposite drive-end bearing assemblies. Each bearing assembly includes an inner race that circumscribes the rotor shaft, an outer race in abutment with the corresponding endcap 34,36, and a ball bearing or rotational element disposed between the inner the outer races. When seated in its appropriate endcap, the inner race of each bearing assembly rotates in conjunction with the rotor while the outer race remains stationary and seated. Advantageously, a lubricant disposed about the ball bearing reduces friction within the bearing assemblies and improves operation of the motor.

Preferably, the permanent magnet motor 30 is sized and dimensioned to fit in the space ordinarily occupied by the right angle gearbox. In that regard, the motor mounts 38 may be arranged and/or fitted with an adapter plates to allow the motor to use the existing bolt pattern of the right angle gearbox and the associated mounting or supporting pedestal structure 70 (FIG. 6) of the cooling tower. Due to the harsh environment inherent with a cooling tower application, a drive end 72 (FIG. 2) and bearings installed in the corresponding end cap 34 of the permanent magnet motor are preferably protected by way of a metallic, non-contacting, non-wearing, permanent compound labyrinth shaft seal that incorporates a vapor blocking ring to prevent the ingress of moisture. A variable frequency drive 74 may also be provided with the permanent magnet motor so as to allow the motor to rotate the fan at various speeds as cooling tower heat removal requirements change. A variable frequency drive also allows trickle current to be applied to the motor windings in a manner to generate an electrical brake for the motor and fan during down time to prevent the fan from free-wheeling due to nominal winds or adjacent cooling tower turbulence. The application of trickle current also allows for the generation of heat sufficient to prevent condensation from building in the motor when the cooling tower is idle. To increase reliability of the system, the motor may be provided with a sensor-less control, thereby eliminating the need for a feedback device external to the motor.

Figure 4:
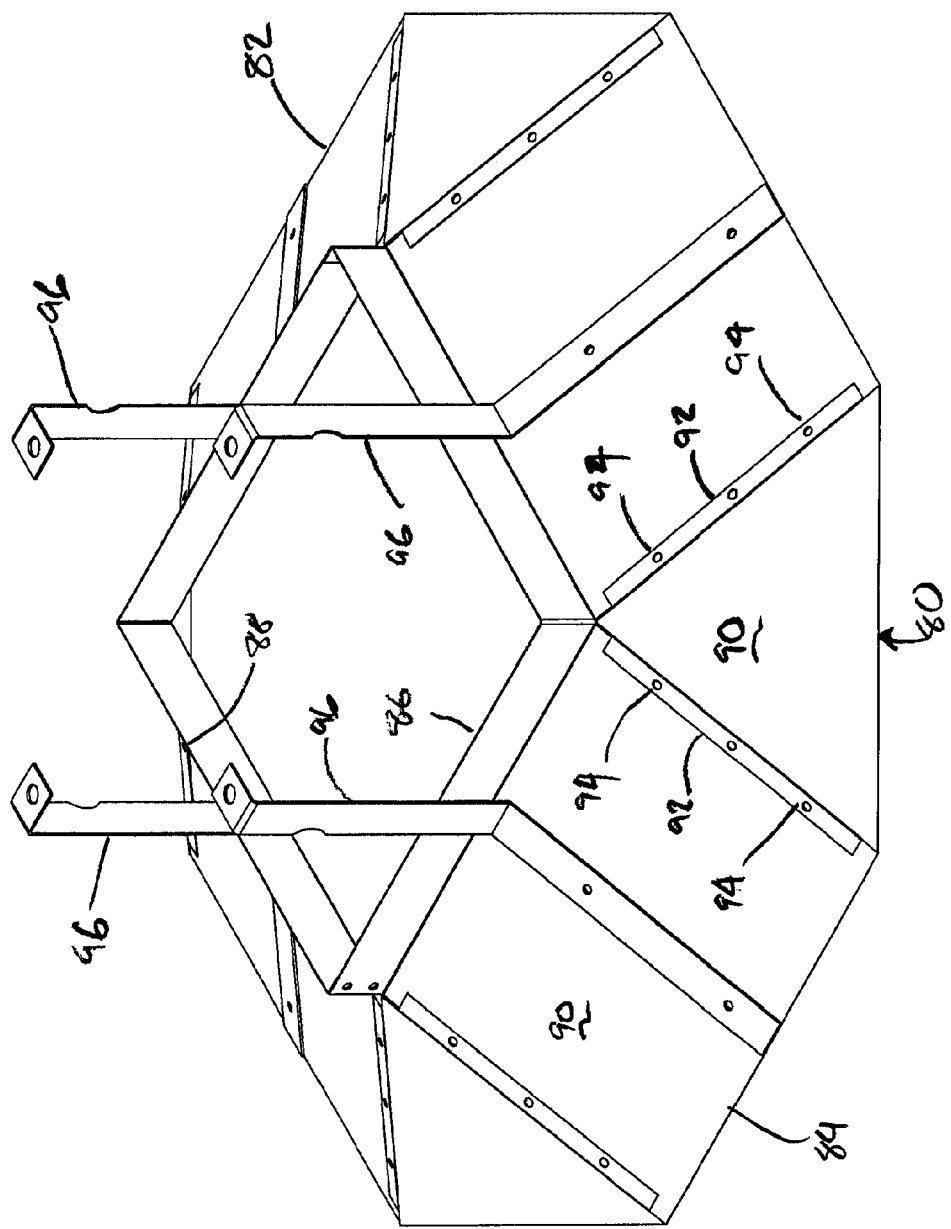
FIG. 4 shows a perspective view of a shroud mechanism used with the motor of FIG. 2 to enhance cooling of the motor.

As mentioned above, the permanent magnet motor mounts to an existing pedestal structure 70 of the cooling tower preferably in the location where the gearbox was originally mounted, so that the shaft 62 of the motor may couple directly to the fan shaft 76 to directly drive the fan of the cooling tower. However, in this location, there is generally minimal air flow due to the pedestal structure of the cooling tower. To improve cooling associated with the motor due to its location in the cooling tower, a shroud 80 as shown in FIG. 4 may be used to direct air drawn by the cooling tower fan over the motor frame. In one embodiment, the shroud 80 comprises a collection member 82 with a large diameter bottom end 84, a necked-down top end 86, and a center hole 88 sized to fit around the outer periphery of the stator core 32. The shroud collection member 82 may comprise sheet metal panels 90 with overlapping strips 92 that may be secured together with mechanical fasteners 94 to form a square pyramid-like arrangement as shown in FIG. 4. Other shapes, including conical shapes, may also be used.

Figure 5:
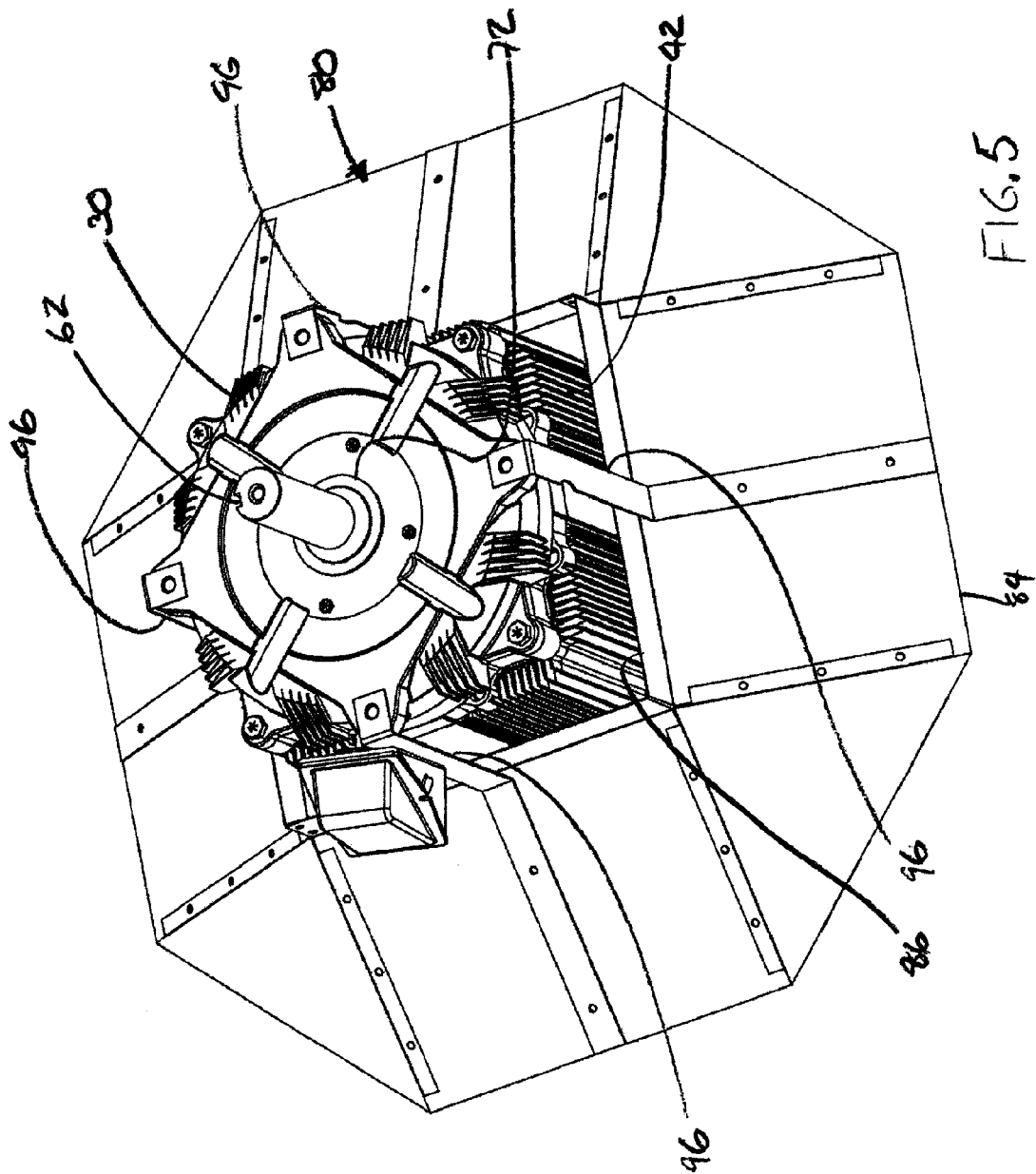
FIG. 5 shows a perspective view of the motor of FIG. 2 and the shroud of FIG. 4 assembled together before installation in the cooling tower.
Figure 6:
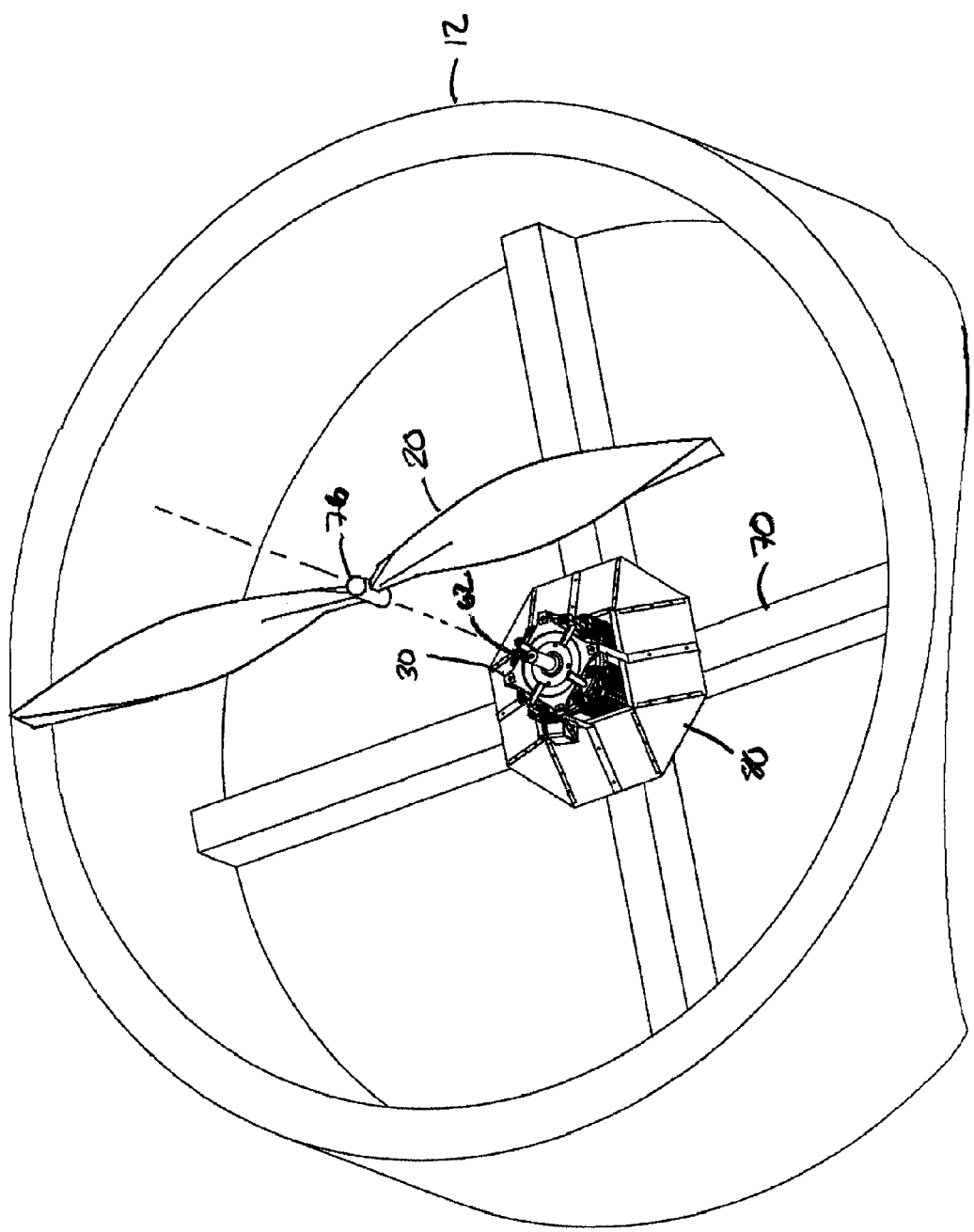
FIG. 6 shows the motor and shroud assembly of FIG. 5 installed in a cooling tower with the motor coupled to a cooling tower fan shaft.

As shown in FIG. 5, the shroud 80 may be positioned generally in the longitudinal mid-point of the motor 30 to optimize air flow along the longitudinally extending heat dissipation fins 42. Brackets 96 may extend from the shroud top end 86 and attach to the driving end of the motor. The length of the brackets 96 may sized, or adjustably sized, to position the shroud at a location relative to the longitudinal side of the motor optimum for cooling the motor. As shown in FIG. 6, air drawn from the cooling tower fan enters the large diameter bottom end 84 of the collection member located at the bottom of the motor and exits at the shroud top end 86 flowing along the heat dissipation fins 42 of the stator core.

The assignee of the present application provides permanent magnet motors that have proven effective in directly driving a fan of a cooling tower within the aforementioned requirements, including with and without use of the shroud. For instance, Reliance Electric Technologies, LLC's permanent magnet motor having part no. FL-4493 has been found suitable in such applications, generating 50 horsepower at 210 rpm with over 1000 foot-pounds of torque. The FL-4493 motor has 8 poles and fits within the footprint of a typical gearbox customarily used in a cooling tower, for instance, a shaft length of approximately 9½ inches, a shaft diameter of approximately 3 inches, an stator length of approximately 22 inches, an overall length of approximately 31 inches, and a mounting flange with holes circumferentially spaced on a 22 inch bolt circle.

In one case study, a cooling tower was tested with one cell having the induction motor, drive shaft, and right angle gearbox configuration as shown in FIG. 1, and an adjacent cell using a permanent magnet motor direct drive configuration as described herein. Each cell of the cooling tower was rated for 4,250 gallons per minute with an inlet hot water temperature of 95 degrees, an exit cold water temperature of 85 degrees, a wet bulb temperature of 78 degrees, and a fan diameter of 18 feet. The permanent magnet motor cell comprised a Reliance Electric Technologies, LLC's permanent magnet motor having part no. FL-4493 replacing and installed in the prior location of the gearbox with its motor shaft directly coupled to the fan shaft. The adjacent cell retained its previous configuration with an induction motor, drive shaft, and right angle gearbox. The existing induction motor comprised a 480 volt, 50 horsepower, two speed (900 rpm/1800 rpm), NEMA TEFC-XT enclosure, 326-T frame induction motor. The gearbox in the original configuration was a 155 size gearbox operating at an 8.5:1 speed reduction ratio. During normal operation of the cells with a fan pitch blade of 12 degrees, the permanent magnet motor drew 49.8 amps and used 33.0 kilowatts while the induction motor drew 54.3 amps and used 37.9 kilowatts. A reduction in start up current usage was also seen where the induction motor drew 347 amps during start up compared to the 12 amps for the permanent magnet motor.

In view of the above, many problems associated with cooling tower maintenance and reliability are solved with the use of the permanent magnet motor. The relatively high speed (typically 1800 rpm) induction motor may be eliminated along with the gearbox, drive shaft and associated disk couplings which often have maintenance problems caused by misalignment, improper lubrication, vibration or delamination of the drive shaft. Elimination of the gearbox eliminates gearbox maintenance issues such as changing the gearbox oil, maintaining proper gearbox oil levels, contamination of gearbox oil, and gearbox oil leaks, which often lead to gearbox failure. The use of the permanent magnet motor with a finned frame, laminated stator design allows the construction of low speed, compact motors for use in place of the existing gearbox. Further, by eliminating the high speed input to the gearbox, the system dynamics and vibrations may be simplified. Because the number of bearings in the drive system may be reduced, the number of resonance frequencies potentially present in the system may also be reduced. It is believed that the use of the permanent magnet motor directly driving the fan will result in lower ambient noise levels.

While specific embodiments have been described in detail and in the foregoing detailed description and illustrated in the accompanied drawings, those with ordinary skill in the art will appreciate that various modifications and alternatives to those details could be developed in light of the overall teachings of the disclosure. According the particular range in disclosed were meant to be illustrative only and not limited as to the scope of the invention, which is to be given the full breath of the appended claims and any and all equivalents thereof.

What is claimed is:

1. A method comprising:
   providing a motor with a stator comprising a plurality of laminations stacked side to side to form a contiguous stator core with each of the laminations having a plurality of radial fins projecting outward from a periphery of the lamination, and a rotor with permanent magnets spaced about the rotor configured to synchronously magnetically couple with a rotating magnetic field in the stator;
   providing a cooling tower with a fan disposed therein having a shaft extending from a center of the fan for rotating the fan; and
   installing the motor in an interior of cooling tower such that the rotor of the motor is coupled directly to the fan shaft and rotates the fan when the motor is energized during normal operation of the cooling tower.

2. The method of claim 1 further comprising removing a gearbox associated with the cooling tower fan before installing the motor in the cooling tower.

3. The method of claim 2, further comprising configuring mounts of the motor in a way sufficient to allow mounting of the motor in the cooling tower in the gearbox's pre-removal location.

4. The method of claim 1, further comprising providing the motor with a sensor-less control.

5. The method of claim 1, further comprising providing the motor with a variable speed drive.

6. The method of claim 1, further comprising mounting a shroud on an exterior surface of the stator adapted to direct air around the fins of the laminations as the cooling tower fan rotates.

7. The method of claim 1 wherein the plurality of fins of each lamination are aligned at least partially along a length of the contiguous stator core to form a least one longitudinal heat dissipation fin on an exterior of the stator core.

8. The method of claim 1, further comprising applying current to the motor sufficient to prevent unintended rotation of the fan.

9. The method of claim 1, further comprising applying current to the motor sufficient to reduce condensation levels in the motor.

10. The method of claim 1, wherein the motor rotates the cooling tower fan having a diameter of between about 7 feet and about 28 feet.

11. The method of claim 1, wherein the motor rotates the cooling tower fan between about 127 revolutions per minute and about 465 revolutions per minute.

12. The method of claim 1, wherein the motor rotates the cooling tower fan to generate flow rates of between about 1200 cubic feet per minute and about 2200 cubic feet per minute.

* * * * *